United States Patent [19]

Sandstrom et al.

[11] Patent Number: 5,430,084
[45] Date of Patent: Jul. 4, 1995

[54] RUBBER CONTAINING SILICA AND TIRE AND TREAD THEREOF

[75] Inventors: Paul H. Sandstrom, Tallmadge; Thomas J. Segatta, Fairlawn; Pamela J. Buss, Akron, all of Ohio

[73] Assignee: The Goodyear Tire & Rubber Company, Akron, Ohio

[21] Appl. No.: 898,591

[22] Filed: Jun. 15, 1992

[51] Int. Cl.⁶ ................................................ C08K 3/00
[52] U.S. Cl. .................................... 524/492; 524/493; 524/525; 524/526
[58] Field of Search ................ 524/492, 493, 525, 526

[56] References Cited

U.S. PATENT DOCUMENTS

| | | | |
|---|---|---|---|
| 4,284,535 | 8/1981 | Lal et al. | 524/526 |
| 4,699,832 | 10/1987 | Sattelmeyer | 524/511 |
| 4,837,266 | 6/1989 | Sattelmeyer | 524/511 |

*Primary Examiner*—Paul R. Michl
*Assistant Examiner*—Edward Cain
*Attorney, Agent, or Firm*—Henry C. Young, Jr.

[57] ABSTRACT

The invention relates to a method of preparing a sulfur curable rubber composition by first forming a pre-blend of polyoctenamer and silica and then blending the pre-blend with at least one additional sulfur curable rubber. The invention also relates to a pneumatic rubber tire having a sulfur cured rubber tread comprised of the aforesaid rubber composition.

4 Claims, No Drawings

RUBBER CONTAINING SILICA AND TIRE AND TREAD THEREOF

FIELD

This invention relates to silica containing unsaturated rubber. The invention particularly relates to a method of addition of silica to a rubber compound. In one aspect, the invention relates to a vulcanized rubber composition containing silica and carbon black. In another aspect, the invention relates to tire having a tread composed or containing such rubber.

In the description of this invention, the terms rubber compound, compounded rubber and rubber composition may be used interchangeable for rubber which has been mixed with rubber compounding ingredients.

BACKGROUND

Rubber is conventionally compounded (mixed) with various ingredients in order to prepare rubber products. Such ingredients typically include curatives, cure activators, resins, reinforcement pigments, processing aids as well as other pigments.

While carbon black is a conventionally preferred reinforcement for many rubber products, silica is often used, often in conjunction with carbon black, as a particulate filler. The silica may have a reinforcing effect, depending on its particle size and whether it is used in combination with a suitable coupling compound.

Siliceous pigments (silica) are often used in various rubber compositions in the form of a precipitated, hydrated silica, typically of the type obtained from the precipitation of a soluble silicate. For example, reference may be made to U.S. Pat. No. 2,940,830 for a method of preparing precipitated silica.

Conventionally, the silica (siliceous pigment) has a silicon dioxide content of more than 50 percent, and more typically at least 80 percent by weight.

While it is acknowledged that there are various forms of colloidal finely-divided silicas which may be used in rubber compositions such as, for example, arc, pyrogenic and precipitated silicas, the precipitated silicas are usually preferred.

Good and homogeneous dispersions of silica pigment in rubber is often and usually difficult to obtain with conventional industrial mixing procedures with relatively short mixing times, and particularly where relatively large amounts of silica are to be used. This is typically because of the relatively strong attraction that silica particles have for one another resulting in the need for very high shear or multiple mix passes (e.g. two or more mixing states) to obtain good dispersion of the silica in rubber.

Thus, in one aspect, is desired, for the practice of this invention, to provide a method of providing a relatively homogeneous dispersion of silica in rubber.

While the silica itself is not normally as good reinforcing agent as carbon black for rubber products, it is a desirable pigment for blending with rubber for the purpose of obtaining an increase in low strain dynamic stiffness without as much hysteresis as carbon black while maintaining tire treadwear performance.

The silica pigment typically has an average particle size in the range of about 100 to about 350 angstroms.

Such silicas are relatively well known to those having skill in the art of rubber compounding.

In some cases, relatively high levels (concentrations) of silica in rubber is desired, particularly where a stiff rubber compound is desired but low hysteresis of the rubber is also desired.

DISCLOSURE AND PRACTICE OF THE INVENTION

In accordance with this invention, a rubber composition comprised of 100 parts by weight of sulfur vulcanizable rubber and from about 10 to about 25 parts by weight particulate silica is prepared by use of a silica masterbatch composed of a polyoctenamer/silica pre-blend.

In one aspect, a rubber pre-blend is provided which comprises (A) 100 parts by weight polyoctenamer, and (B) about 60 to about 90 parts by weight silica pigment.

In the basic practice of this invention a method of preparing a sulfur curable rubber composition comprises the steps of (a) blending 100 parts by weight polyoctenamer with about 60 to about 90 parts by weight silica to form a rubber pre-blend; and (b) blending at least one additional sulfur curable rubber with a sufficient amount of said rubber pre-blend to form a rubber composition having a silica content of about 10 to about 25 weight percent based on the total of said polyoctenamer and said other additional rubber.

In one aspect of this invention, a sulfur curable rubber composition is prepared according to such method.

In another aspect of this invention, a pneumatic rubber tire is provided having a sulfur cured rubber tread composition prepared according to such method.

In further accordance with this invention, a rubber composition is provided which comprises (i) 100 parts by weight rubber and (ii) about 21 to about 67, preferably about 34 to about 45, parts by weight of said pre-blend, where the polyoctenamer of the pre-blend is considered a part of the rubber.

In the practice of the method of this invention, the silica is preferably a precipitated silica and said polyoctenamer is preferably a metathesis polymer of cyclooctene with predominantly trans-isomeric carbon-to-carbon double bonds.

It is a particularly important feature of this invention, that a rubber pre-blend of polyoctenamer with a relatively large amount of particulate silica may be prepared.

The blending of high levels of silica with conventional polymers was not successfully achieved.

It is an important feature of this invention that the pre-blend contains the particulate silica as a relatively homogeneous dispersion of the silica within the polyoctenamer.

Indeed, by the practice of this invention, it has been observed that the use of the silica masterbatch, or pre-blend, produces improved rubber properties versus the use of the same materials freely mixed. These improved properties require a minimum of 60 phr silica in the pre-blend.

Uniquely, the polyoctenamer is used as the rubber for the pre-blend because the polyoctenamer, in its uncured stage, has a property of low Mooney viscosity at elevated temperatures of 80° C. or higher which is especially beneficial to the mixing of high levels of silica, since it is difficult to disperse and, thus, is highly advantageous for production of a silicarubber masterbatch.

In turn, the aforesaid pre-blend can then be blended with other rubbers, particularly sulfur curable, unsaturated rubbers, in order to produce a final rubber formulation, or composition, having well dispersed silica.

Thus, a rubber blend is prepared, composed of the pre-blend and the additional rubber, which is advantageous because it reduces rubber compound hysteresis as compared to a free blend of identical materials (rubber and silica).

In the practice of this invention, the preferred particulate silica is of the type VN-2 by Degussa or Hi-Sil 210 by PPG Industries which may generally be referred to as a precipitated silica. In the practice of the invention, the polyoctenamer rubber (or trans-polyoctenylene rubber as it may be sometimes referenced) is described as a metathesis polymer of cyclooctene with predominately trans-isomeric carbon to carbon double bonds. Generally, a particular feature of the unvulcanized polyoctenamer is that it has a Mooney viscosity (ML-4) typically in a range of about 4 to about 6 at 120° C. and, thus, acts much as a rubber processing oil under rubber processing conditions.

Indeed, it is a particular feature of the polyoctenamer that it can be heavily loaded with large concentrations of the silica, and still be sufficiently fluid enough that it can be relatively easily processed.

The other rubbers to be blended with the aforesaid pre-blend of the polyoctenamer and silica, and optionally carbon black, can be of various rubbers, preferably rubbers which can be sulfur cured, representative of which are those containing carbon to carbon unsaturation therein in order to enable them to be sulfur cured such as, for example, cis 1,4-polyisoprene (natural and synthetic), polybutadiene, 3,4-polyisoprene, styrene/butadiene copolymers, styrene/isoprene/butadiene terpolymers, butadiene/acrylonitrile copolymers and isoprene/acrylonitrile copolymers. Generally, two or more of natural rubber (cis 1,4-polyisoprene) and synthetic rubbers such as cis 1,4-polyisoprene, polybutadiene, 3,4-polyisoprene, styrene/butadiene copolymers and styrene/isoprene/butadiene terpolymers may be preferred.

While such other rubbers are described as being sulfur curable for a characterization purpose, it is to be understood that relatively small amounts of additional curatives such as, for example, well known peroxides, can be used together with the sulfur curatives to cure the rubber.

As is relatively seen in this description, the cis 1,4-polyisoprene can be either natural rubber or synthetic rubber, with the natural rubber being preferred.

The polybutadiene rubbers can be those with typical low vinyl contents or it can be those with medium to high vinyl contents such as about 30 to approximately 90 or, more typically, about 40 to about 70. Such rubbers are well known to those having skill in such art.

The styrene/butadiene copolymer rubber (SBR) can be of the solution or of the emulsion polymerization prepared type with various amounts of vinyl content and styrene content. Such rubbers are also well known to those having skill in such art.

It is to be understood by one having skill in the art that various other additives can be and typically are utilized and mixed with the rubber composition such as, for example, those selected from carbon black, rubber processing oils, sulfur cure accelerators and retarders, if desired, antidegradants, zinc oxide, zinc stearate and/or zinc acid and other pigments, if desired, as well as the sulfur curative.

For the purposes of this invention, it is preferred that the aforesaid rubber pre-blend of polyoctenamer and silica does not contain either of the sulfur or peroxide curative or cure accelerators for the rubber composition.

While the ingredients may be mixed by conventional means which are well known to those having skill in the art, as hereinbefore described, it is a particular feature of this invention that a pre-blend of the polyoctenamer and silica is first prepared and then mixed with the remainder of the ingredients.

The pre-blend is then mixed with the remainder of the ingredients, which includes at least one additional unsaturated rubber in a suitable mixing apparatus. If desired, a third step in the mixing process can be utilized in which, for the third step, a remainder of ingredients such as sulfur and accelerators are added. Such stepwise processing and variations thereof are generally well known to those having skill in such art, as well as other mixing steps and procedures, except, insofar as the inventors are aware, none of such mixing procedures involved preparing a pre-blend of polyoctenamers with relatively large concentrations of silica.

Indeed, although the contribution of the silica pre-blend might not be fully understood, in the finally cured rubber product, the more homogeneous dispersion of the silica within the rubber presents the following advantages: lower hysteresis (higher rebound) and increase in the 300% modulus of the cured rubber composition.

The silica-loaded rubber compounds of this invention are considered to be particularly useful for tire components such as tread, sidewall and ply coats.

The practice of this invention is fully illustrated by referenced to the following Example which is intended no be representative rather than restrictive of the scope of the invention. Unless otherwise indicated, all parts and percentages are by weight.

EXAMPLE I

A blend of polyoctenamer and silica was prepared as a pre-blend according to Table 1.

TABLE 1

| Material | Parts |
|---|---|
| Polyoctenamer[2] | 100 |
| Silica[3] | 80 |
| Aromatic Oil | 4 |
| Total[1] | 184 |

[1]Obtained as a blend of the materials listed in Table 1 from Huls.
[2]Obtained as Vestenamer 8012 and 6213 from Huls. The mixture was 30% 8012 and 70% 6213.
[3]Obtained as VN-2 from Degussa.

EXAMPLE II

Blends of rubbers and silica were prepared as follows:

| | Parts | | |
|---|---|---|---|
| Material | (Control) Exp. A | Exp. B | (The Invention) Exp. C |
| Polyoctenamer[2] | 0.0 | 18.75 | 0.0 |
| Silica[3] | 15.0 | 15.0 | 0.0 |
| Natural Rubber | 100 | 81.25 | 81.25 |
| Pre-blend (Table 1)[4] | 0.0 | 0.0 | 34.50 |
| Carbon Black | 45.0 | 45.0 | 45.0 |
| Processing Oil | 9.0 | 9.0 | 8.25 |
| Antidegradants | 2.0 | 2.0 | 2.0 |

-continued

| | Parts | | |
|---|---|---|---|
| Material | (Control) Exp. A | Exp. B | (The Invention) Exp. C |
| Second Stage Curatives[1] | | | |
| Accelerator(s) | 1.9 | 1.9 | 1.9 |
| Zinc Oxide | 3.0 | 3.0 | 3.0 |
| Sulfur | 1.6 | 1.6 | 1.6 |

[1]The second stage curatives were added after the other ingredients were mixed together.
[2]Obtained as Vestenamer 8012 from Huls.
[3]Obtained as VN-2 from Degussa.
[4]The polyoctenamer and silica blend according to Example 1.

Exp. A, as a control, illustrates a blend of rubber with a somewhat conventional amount of silica.

Exp. B illustrates a-blend of rubber with Vestenamer 8012 and VN-2 silica to show the properties of a free mix in the same formulation.

Exp. C illustrates the utilization of a polyoctenamer/silica pre-blend (with a high concentration of silica) mixed with other rubber and ingredients to achieve, basically, the concentration of silica as in Exp. A (Control) and identical formulation as B.

Appearance of the respective blends was as follows:

Exp. A—smooth with few areas of undispersed ingredients; and

Exp. B—same as Exp. A.

Exp. A, B and C blends were cured at a temperature of about 150° C. for about 18 minutes.

Various physical properties were measured and are reported as follows in Table 2.

TABLE 2

| | (Control) | | |
|---|---|---|---|
| Property | Exp. A | Exp. B | Exp. C |
| Stress-Strain | | | |
| 300% Modulus (MPa) | 10.1 | 12.6 | 13.2 |
| Tensile (MPa) | 17.9 | 18.4 | 19.3 |
| Elongation (%) | 499 | 451 | 445 |
| Zwick Rebound | | | |
| RT | 48.4 | 47.3 | 50.9 |
| 100° C. | 64.1 | 65.3 | 68.4 |

Stress-Strain properties show that Exp. C provides increased modulus and tensile because of the addition of silica via a pre-blend.

The Rebound shows that the Exp. C rubber exhibits lower hysteresis.

Therefore, it is readily seen that preparation of a rubber silica blend by utilization of a pre-blend of polyoctenamer/silica is particularly beneficial because it provides a method of easily dispersing silica in a rubber compound. The rubber compound containing aforementioned pre-blend provides reduced hysteresis and increased 300% modulus and tensile, valuable rubber properties for use in tires, particularly tire treads.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a sulfur curable rubber composition blend of at least one sulfur curable rubber and a polyoctenamer which contains about 10 to about 25 weight percent silica based upon said rubber and polyoctenamer which comprises the steps of
   (a) blending, in the absence of sulfur or peroxide curative(s) or cure accelerator(s) for said sulfur curable rubber composition, 100 parts by weight polyoctenamer with essentially all of the silica in an amount of about 60 to about 90 parts by weight precipitated silica pigment to form a rubber pre-blend containing a dispersion of said silica; wherein said polyoctenamer is characterized by having an unvulcanized Mooney (ML-4) viscosity in a range of about 4 to about 6 at 120° C. and is a metathesis polymer of cyclooctene with predominantly trans-isomeric carbon-to-carbon double bonds;
   (b) blending at least one additional sulfur curable rubber with a sufficient amount of said rubber pre-blend to form said rubber composition having a silica content of about 10 to about 25 weight percent based on the total of said polyoctenamer and said additional rubber.

2. A sulfur curable rubber composition prepared according to the method of claim 1.

3. A pneumatic rubber tire having a sulfur cured rubber tread comprised of a sulfur cured rubber composition prepared according to the method of claim 1.

4. A pneumatic rubber tire having a sulfur cured rubber tread comprised of a sulfur cured composition of claim 2.

* * * * *